(12) United States Patent
Dick et al.

(10) Patent No.: US 6,251,357 B1
(45) Date of Patent: Jun. 26, 2001

(54) HIGH PURITY ALKALI METAL CHLORITE AND METHOD OF MANUFACTURE

(75) Inventors: Peter David Dick, Brampton; Gerald Cowley, Mississauga, both of (CA)

(73) Assignee: Sterling Canada, Inc., Houston, TX (US)

( * ) Notice: Subject to any disclaimer, the term of this patent is extended or adjusted under 35 U.S.C. 154(b) by 0 days.

(21) Appl. No.: 09/327,529

(22) Filed: Jun. 8, 1999

Related U.S. Application Data

(60) Provisional application No. 60/088,542, filed on Jun. 9, 1998.

(51) Int. Cl.$^7$ ............................................. C01B 11/10
(52) U.S. Cl. ................................. 423/472; 423/478
(58) Field of Search .................... 423/472, 478, 423/475

(56) References Cited

U.S. PATENT DOCUMENTS

| | | | |
|---|---|---|---|
| 2,092,944 | 9/1937 | Vincent | 423/472 |
| 2,092,945 | 9/1937 | Vincent | 423/472 |
| 2,194,494 | 3/1940 | Cunningham | 423/472 |
| 2,323,180 | 10/1943 | Soule | 423/472 |
| 2,616,783 | 11/1952 | Wagner | 423/472 |
| 2,833,624 * | 5/1958 | Sprauer | 423/472 |
| 3,101,248 | 8/1963 | Hirschberg et al. | 423/472 |
| 3,450,493 | 6/1969 | Bellay et al. | 423/472 |
| 3,760,065 * | 9/1973 | Rapson | 423/478 |
| 3,828,097 | 8/1974 | Callerame | 423/472 |
| 3,997,462 * | 12/1976 | Denaeyer et al. | 423/472 |
| 4,081,520 | 3/1978 | Swindells et al. | 423/478 |
| 4,086,329 * | 4/1978 | Cowley et al. | 423/478 |
| 4,087,515 | 5/1978 | Miller | 423/472 |
| 4,421,730 | 12/1983 | Isa et al. | 423/478 |
| 4,465,658 * | 8/1984 | Fredette | 423/478 |
| 4,473,540 | 9/1984 | Fredette | 423/479 |
| 4,683,039 | 7/1987 | Twardowski et al. | 204/95 |
| 5,091,166 | 2/1992 | Engström et al. | 423/478 |
| 5,091,167 | 2/1992 | Engström et al. | 423/478 |
| 5,116,595 | 5/1992 | Scribner et al. | 423/477 |
| 5,205,995 | 4/1993 | Scribner et al. | 422/189 |
| 5,366,714 | 11/1994 | Bigauskas | 423/478 |
| 5,593,653 | 1/1997 | Scribner et al. | 423/477 |
| 5,597,544 | 1/1997 | Barber et al. | 423/472 |
| 5,639,559 | 6/1997 | Mason et al. | 423/472 |

FOREIGN PATENT DOCUMENTS

| | | | |
|---|---|---|---|
| 2189289 | 10/1996 | (CA) . | |
| 55-098965 * | 7/1980 | (JP) | 423/472 |
| 56-92102 * | 7/1981 | (JP) | 423/472 |

OTHER PUBLICATIONS

Masschelein, W.J. Chlorine Dioxide. Chemistry and Environmental Impact of Oxyclorine Compounds, (1979) *Industrial Synthesis* pp. 130 to 145.

Patent Abstracts of Japan, vol. 005, No. 160 (C–075) Oct. 15, 1981 and JP 56 092102 A (Japan Carlit Co. Ltd.: The) Jul. 25, 1981 abstract.

* cited by examiner

*Primary Examiner*—Ngoc-Yen Nguyen
(74) *Attorney, Agent, or Firm*—Sim & McBurney

(57) ABSTRACT

Alkali metal chlorite, particularly sodium chlorite, is produced with a low carbonate level by combining a chlorine dioxide generating system operating at subatmospheric pressure with a chlorite formation reactor in which the chlorine dioxide reacts with hydrogen peroxide in the presence of aqueous alkali metal hydroxide, particularly sodium hydroxide.

17 Claims, 1 Drawing Sheet

HIGH PURITY ALKALI METAL CHLORITE AND METHOD OF MANUFACTURE

This application claims benefit to U.S. provisional application Ser. No. 60/088,542, filed Jun. 9, 1998.

FIELD OF THE INVENTION

This invention relates to a process for the preparation of chlorite compositions with a very low carbonate content by the reduction of chlorine dioxide generated from chlorate in a subatmospheric type chlorine dioxide generator.

BACKGROUND TO THE INVENTION

Alkali metal chlorites are well known precursors of chlorine dioxide with a wide range of applications, mainly in water treatment, pulp bleaching and textile bleaching. Chlorites are prepared typically by the reaction of chlorine dioxide, a reducing agent and an alkali. An exhaustive discussion of various preparative methods for chlorite synthesis can be found in the basic textbook entitled: "Chlorine Dioxide. Chemistry and Environmental Impact of Oxychlorine Compounds" by W. J. Masschelein, 1979, pp. 130 to 145.

Various improvements to the basic concept of reacting chlorine dioxide with the reducing agent and alkali to form chlorite are disclosed in the U.S. Patents discussed below.

U.S. Pat. Nos. 2,092,944 and 2,092,945 (Vincent) disclose the preparation of water soluble chlorites by reacting chlorine dioxide with an alkaline solution containing sulfur or a carbonaceous reducing agent.

U.S. Pat. No. 2,194,194 (Cunningham) discloses the use of metallic reducing agents for the preparation of chlorites.

U.S. Pat. No. 2,332,180 (Soule) discloses the use of hydrogen peroxide and alkali metal bicarbonate in chlorite synthesis. The same reducing agent is disclosed in the U.S. Pat. No. 2,616,783 (Wagner), related to the preparation of solid chlorite.

U.S. Pat. No. 3,101,248 (Hirschberg et al) discloses a process for chlorite synthesis involving the use of various alkali metal and alkaline earth metal amalgams as reducing agents.

U.S. Pat. No. 3,450,493 (Du Bellay et al) discloses a method for the manufacture of alkali metal chlorites, employing a continuous monitoring of redox potential and pH for correct process control.

U.S. Pat. No. 3,828,097 (Callerame) discloses a process for the preparation of chlorous acid, involving the use of nitrite in a column containing a cation exchange resin.

U.S. Pat. No. 4,087,515 (Miller) discloses the use of alkali metal amalgams as reducing agents whereby the process is carried out under an atmosphere of nitrogen gas to prevent an excessive build-up of chlorine dioxide.

U.S. Pat. No. 5,597,544 (Barber et al) and U.S. Pat. No. 5,639,559 (Mason et al) disclose a gas phase reaction between chlorine dioxide and reducing agent whereby the resulting chlorous acid is subsequently reacted with aqueous solution of the base, such as hydroxide, carbonate or bicarbonate to form chlorite in high yield.

A major drawback of all of the above described processes is a high content of certain impurities, particularly carbonates and bicarbonates, in the final product. According to the published literature (see, for example, previously cited Masschelein, p. 131, lines 10 and 11) a typical, commercial 80% sodium chlorite product generally contains about 5% sodium carbonate.

Such a high level of carbonates is detrimental at the point of use of alkali metal chlorite, in particular when chlorite is converted to chlorine dioxide to be used for water disinfection or pulp bleaching. The presence of carbonates causes the formation of scale in the equipment employed for chlorine dioxide generation, resulting in higher operating costs and troublesome maintenance. While there are known methods for the purification of sodium chlorite from the carbonate impurity, they are very costly and often they create more problems than they solve. For example, a carbonate removal method based on the precipitation of lead carbonate (see Masschelein, p. 138) may result in the contamination of chlorite with highly poisonous lead compounds, rendering the product unsuitable for water treatment applications.

There is a need, therefore, to develop an economical process enabling the manufacture of alkali metal chlorite with a very low carbonate content, thus eliminating the costly purification step of the final product.

SUMMARY OF THE INVENTION

Accordingly, the present invention is directed towards alleviating the problems and disadvantages of the prior art by providing an economical process for the manufacture of alkali metal chlorite with a very low carbonate content which does not require purification of the final product.

Surprisingly, it has been found that by combining a chlorine dioxide generation system operating at subatmospheric pressures with the chlorite formation reactor involving the use of hydrogen peroxide as a reducing agent, it is possible to obtain an alkali metal chlorite with a carbonate level significantly lower than that reported in the prior art for the conventionally produced chlorite product.

Such a combination of a subatmospheric chlorine dioxide generator and a chlorite formation reactor yields a chlorite product with the carbonate content being significantly below about 1 wt. % (based on an about 37 wt. % sodium chlorite solution) and below about 2 wt. % (based on the solid about 80% sodium chlorite). The 37 wt. % solution of sodium chlorite manufactured according to the process of the present invention contains preferably less than about 0.5 wt. % sodium carbonate (as $Na_2CO_3$) and most preferably less than about 0.3 wt. % $Na_2CO_3$, while the solid 80% sodium chlorite contains preferably less than about 1 wt. % $Na_2CO_3$ and most preferably less than about 0.6 wt. % $Na_2CO_3$.

Without being bound by any particular theory, it is believed that the enhanced purity of the product resulting from the process of the present invention can be attributed to a specific mode of chlorine dioxide generation whereby the effect of subatmospheric pressure in the chlorine dioxide generator is reflected in a lower content of carbon dioxide in the chlorine dioxide gas/water vapour mixture leaving the generator. Such a mixture, upon being reacted with hydrogen peroxide and alkali in the chlorite formation reactor, yields, in turn, a chlorite product with a lower carbonate content.

Accordingly, in one aspect of the present invention, there is provided a method of producing an alkali metal chlorite with a low carbonate level, which comprises:

effecting the generation chlorine dioxide by reducing chlorate ions to chlorine dioxide in an aqueous reaction medium at its boiling point under a subatmospheric pressure in a first reaction zone, remove a gaseous admixture containing chlorine dioxide from said first reaction zone, feeding chlorine dioxide to a second reaction zone, reacting the chlorine dioxide with an aqueous alkali metal hydroxide solution and hydrogen peroxide as a reducing agent in said second reaction zone, and removing an aqueous solution of alkali metal chlorite having a low carbonate ion concentration from said second reaction zone.

The chlorite formation reactor is preferably operated under vacuum, which may further improve the chlorite product purity.

GENERAL DESCRIPTION OF THE INVENTION

Figure 1:
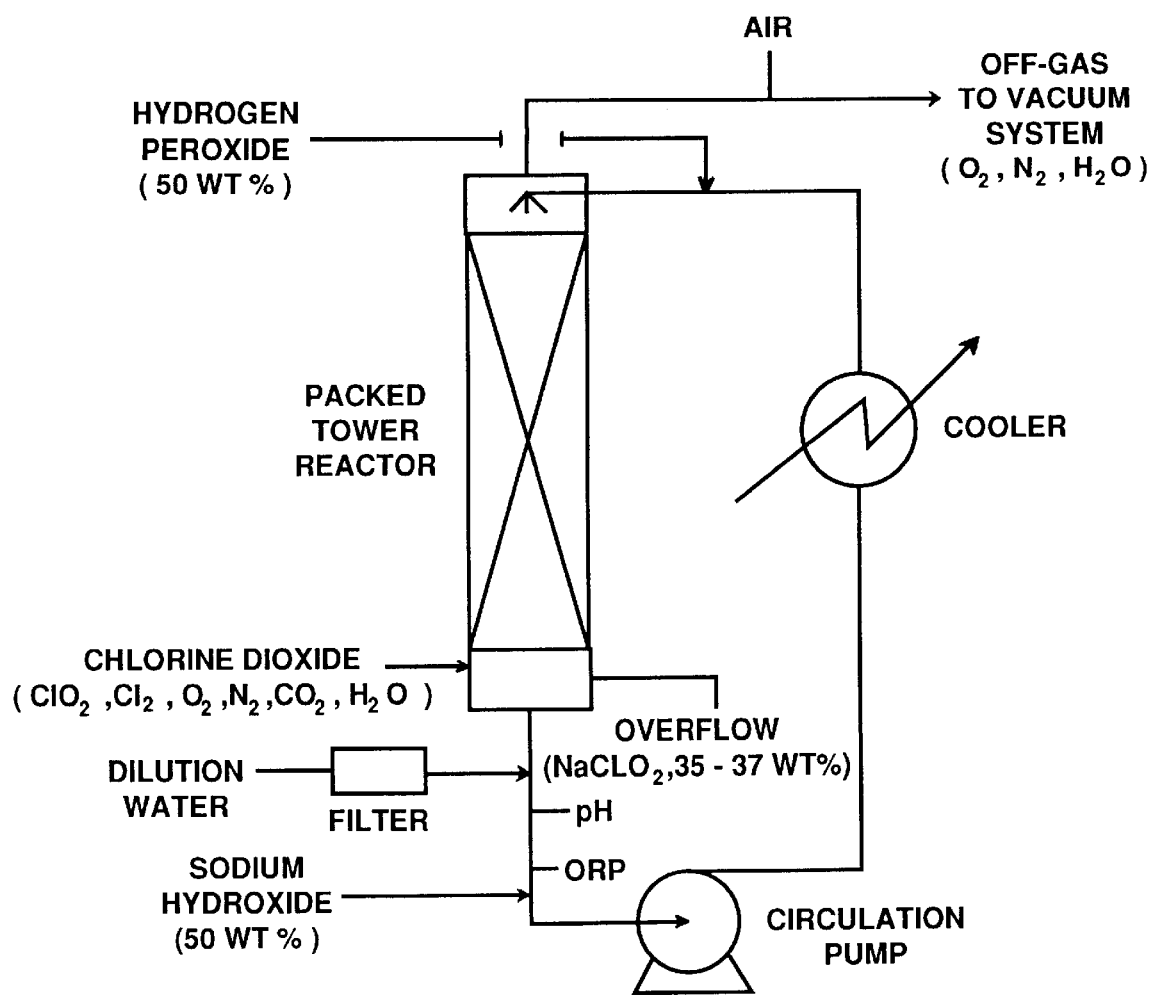
FIG. 1 is a schematic diagram illustrating a preferred design of sodium chlorite reactor utilized in one embodiment of the invention.

Various subatmospheric type chlorine dioxide generators can be employed in the process of the present invention. While all these generators operate at a subatmospheric pressure, generally in the range of about 100 to about 400 mm Hg, they may employ different reducing agents to convert alkali metal chlorate feed to chlorine dioxide in the acidic medium. Typical reducing agents which may be employed include chloride ions (originating from alkali metal chloride or hydrochloric acid), sulfur dioxide, hydrogen peroxide, methanol or a combination thereof.

In one particular embodiment of the present invention, chloride ions having a concentration of from about 1 M to about 5 M, preferably 2 M to about 3 M, are reacted with chlorate ions having a concentration of from about 0.1 M to about 7 M, preferably about 5 M to about 7 M, in an aqueous acid reaction medium having an acid normality of from about 0.05 N to about 5 N, preferably from about 0.1 N to about 2 N. Sodium chloride precipitated in the system may be separated by means of a filter. However, if desired, the chlorine dioxide generator may be integrated with the sodium chlorate manufacturing plant and, in such a case, a solution or slurry containing sodium chloride may be recycled to the chlorate plant. A gaseous product mixture from the generator containing, in addition to chlorine dioxide, also some chlorine and water vapour, may be absorbed in any suitable aqueous medium. However, it is beneficial for the absorption medium to preferably absorb chlorine dioxide and less preferably chlorine. An example of such a medium is dilute hydrochloric acid. A suitable reagent able to destroy traces of chlorine, such as, for example hydrogen peroxide, may optionally be added to the absorption medium, if desired.

In order to transfer the absorbed chlorine dioxide from the absorption medium to the chlorite formation reactor, any suitable gas stripping method, may be employed. The stripping of chlorine dioxide may be carried out with an inert gas or gas mixture, such as air or nitrogen. If air is used in the chlorine dioxide stripping, it is beneficial to purify the air from the traces of carbon dioxide, by using, for example, a caustic scrubber. It is also beneficial to minimize the input of air into the system by, for example, air recycling and by operating the absorption/stripping system under subatmospheric pressure. Hydrogen peroxide can optionally be added to the system prior to effecting the stripping step.

If desired, the gaseous product mixture formed in the chlorine dioxide generator can be transferred directly to the chlorite formation reactor without the intermediate steps of chlorine dioxide absorption and stripping. Instead of an absorption/stripping procedure, for the chlorine dioxide, a novel method based on the use of gas transfer membranes, such as described in the U.S. Pat. No. 4,683,039 (Twardowski et al) can be employed. The latter method enables the transfer of chlorine dioxide in the absence of any air addition.

The above described chloride-based chlorine dioxide generation procedure can be modified by an addition of a supplementary reducing agent, such as hydrogen peroxide, in a similar manner to that disclosed in the published Canadian patent application No. 2,189,289 (Bechberger et al).

If desired, the performance of the chloride-based chlorine dioxide generator can be improved by using any suitable catalytically-active agent containing elements, such as silver, manganese, palladium, chromium, vanadium or a combination thereof.

While chloride ion is generally considered to be a rather inexpensive reducing agent, its reaction with chlorate ion necessarily results in the formation of some chlorine (see reaction below):

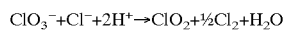
$$ClO_3^- + Cl^- + 2H^+ \rightarrow ClO_2 + \frac{1}{2}Cl_2 + H_2O$$

which may negatively affect the purity of the final chlorite product and, also, may increase the consumption of hydrogen peroxide in the chlorite formation step.

Therefore, in another embodiment of the present invention a hydrogen peroxide based chlorine dioxide generator is employed to yield a very pure, essentially chlorine-free, gaseous product. In such process, hydrogen peroxide is believed to react with chlorate ion according to the following reaction:

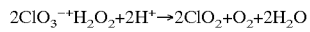
$$2ClO_3^- + H_2O_2 + 2H^+ \rightarrow 2ClO_2 + O_2 + 2H_2O$$

This reaction is typically stoichiometric and can be carried out in a very broad acid normality range of from about 2 N to about 14 N, preferably from about 6 N to about 12 N. The optimum chlorate ion concentration is dependent on the acid normality in the reaction medium and can vary from about 0.1 M to saturation, preferably from about 0.5 M to about 3.5 M. An operation at higher acidities is typically associated with a lower chlorate concentration in the reaction medium. The gaseous product mixture comprising chlorine dioxide and water vapour can be used directly in the chlorite formation reactor without the intermediate step of recovery of chlorine dioxide solution, i.e., by omitting the absorption and stripping stages.

Such an operation may lead to significant cost savings due to the elimination of certain parts of the conventional chlorine dioxide generating system, such as condenser, absorption tower and stripping tower. By comparison, a conventional, subatmospheric, hydrogen peroxide based chlorine dioxide generating system (as described, for example, in U.S. Pat. Nos. 5,091,166 and 5,091,167 (Engstrom)) requires a distinct step of recovering an aqueous solution of chlorine dioxide.

The co-produced oxygen gas can be used along with the water vapour for the dilution of gaseous chlorine dioxide to safe concentration levels. By adjusting the chlorine dioxide to water vapour ratio to meet the requirements of the chlorite formation reactor, the water balance of the overall system can be greatly improved. The relative ratio of chlorine dioxide and water vapour in the gaseous mixture entering the chlorite formation reactor affects the concentration of alkali metal chlorite in the final product solution. Therefore, there may still be a need to condense at least some of the water vapour. However, the size of the condenser required for this purpose can be minimized accordingly.

It is beneficial to integrate the subatmospheric, hydrogen peroxide based chlorine dioxide generator with a methanol based chlorine dioxide generating system (such as described in U.S. Pat. No. 4,081,520 (Swindells et al) and U.S. Pat. No. 4,473,540 (Fredette)), whereby the acidic, sulfate containing effluent or slurry formed in the hydrogen peroxide based generator is cascaded to the methanol based generator. Such an operation eliminates the requirement for the filtration step following the hydrogen peroxide based generator.

It is particularly beneficial to adjust the production rates in both chlorine dioxide generators so that the output of the methanol based generator is at least about 25% higher than that of the hydrogen peroxide based generator.

The chlorine dioxide produced in the hydrogen peroxide-based generator is preferably used for the chlorite manufacture, while the gaseous product from the methanol based generator can be employed for pulp bleaching. The acid sulfate containing slurry leaving the methanol-based generator can be metathesized, if desired, to a neutral saltcake in the process similar to that disclosed in the U.S. Pat. Nos. 5,116,595 (Scribner et al), 5,205,995 (Scribner et al) and 5,593,653 (Scribner et al), with the acidic product of metathesis being recycled preferably to the methanol based generator.

The above described cascade of two subatmospheric chlorine dioxide generators offers several advantages which are difficult to accomplish in the conventional generators, such as described in the previously cited U.S. Pat. Nos. 5,091,166 and 5,091,167. For example, it is possible to add a small amount of sodium chloride, typically about 0.5 to about 1.0 wt. % based on the chlorate, to the hydrogen peroxide based generator preferably operating at acid normalities above 5N. Such an addition of chloride may have little or no impact on the chlorine dioxide purity resulting from the hydrogen peroxide based process, while such addition may be beneficial with regard to the production rate and efficiency. The presence of hydrogen peroxide should effectively prevent chlorine from being generated in the chlorine dioxide generating process.

Since there is preferably no recovery of sulfate crystals following the hydrogen peroxide based generator, it is possible to operate the hydrogen peroxide-based chlorine dioxide generating process at acidities above the upper acidity limit disclosed in the previously cited U.S. Pat. No. 5,091,167 i.e., about 11 N). Higher acidity may be beneficial as far as the production rate is concerned. However, some increase of the corrosion rate can be expected at such high acid normalities. An operation at higher acidities may be combined with a small addition of sodium chloride in order to prevent possible white-outs in such a case. Any possible chloride input to the peroxide-based process may ultimately exit the system with the chlorine dioxide produced in the methanol-based chlorine dioxide generator. However, the impact on the product purity should not be significant, especially when the production capacity of the latter process is much higher than that of the peroxide-based process.

The combination of two subatmospheric chlorine dioxide generators permits all or part of the chlorine dioxide containing condensate originating from the peroxide-based process to be forwarded to the chlorine dioxide absorption system associated with the methanol-based process. This embodiment is particularly beneficial since the need to remove the chlorine dioxide from the condensate is eliminated.

Any suitable catalyst, such as disclosed in the U.S. Pat. No. 4,421,730 (Isa et al), can be added to the peroxide-based chlorine dioxide generating process, if desired. It is understood that the chlorate ions required for the chlorine dioxide generation can be supplied not only by alkali metal chlorate, preferably sodium chlorate, but also by chloric acid or mixtures thereof with alkali metal chlorate. The preferred acid used in the process of the present invention is sulfuric acid, but any other strong mineral acid, such as perchloric acid, chloric acid, nitric acid, phosphoric acid, hydrochloric acid or the mixtures thereof can also be employed. The feed stocks to the chlorine dioxide generator can be premixed, if desired, in a similar manner to that described in the U.S. Pat. No. 5,366,714 (Bigauskas).

Any suitable reactor design can be used in the chlorite formation step. One preferred design involves the use of a packed tower reactor as depicted in FIG. 1.

The chlorite liquor is recirculated and enters the reactor from the top. Hydrogen peroxide is added to the recirculation loop at a point prior to the entry to the reactor. Sodium hydroxide and, optionally, dilution water is added at the bottom of the recirculation loop. The addition point of chlorine dioxide diluted with at least one inert gas, such as air, water vapour and nitrogen, is at the bottom of the reactor. The gas is passed counter-currently to the chlorite liquor.

The system is maintained under reduced pressure generally in the range of about 50 to about 500 mmHg preferably about 50 to about 200 mmHg, and most preferably about 50 to about 150 mmHg. The pH of the reaction medium is maintained generally in the range of about 11.8 to about 13.0, preferably about 12.0 to about 12.6. The hydrogen peroxide excess is maintained using a potentiometric (ORP) measurement. The ORP values, which are pH dependent, are generally maintained in the range of between about $-30$ to about $-200$ mV vs Ag/AgCl, preferably about $-40$ to about $-90$ mV vs Ag/AgCl

EXAMPLE

This example illustrates the preparation of sodium chlorite with low carbonate content according to the invention.

An R5 type single vessel process carried out at a boiling point of 73° C. under subatmospheric pressure of 190 mm Hg was used to generate chlorine dioxide at a production rate of between 5 and 10 tonnes/day. A reaction medium in the generator contained 6 M $NaClO_3$ and 1 M NaCl and had a total acid normality produced by hydrochloric acid of about 0.1 N. The concentration of reactants were maintained by continuous feed of sodium chlorate, sodium chloride and hydrochloric acid to the reaction medium. The gaseous products of the reaction between chlorate and chloride ions, i.e. chlorine dioxide and chlorine, were steam stripped from the reaction medium. Chlorine dioxide was separated from chlorine using a conventional absorption/stripping system.

The chlorine dioxide product, optionally purified from residual chlorine by using hydrogen peroxide addition, was then stripped into the chlorite reactor and converted to sodium chlorite in a reaction with hydrogen peroxide and alkali, carried out under vacuum conditions of less than 200 mmHg at a temperature of 25° C. The resulting product solution contained approximately 37 wt % sodium chlorite and only 0.18 wt % sodium carbonate (as $Na_2 CO_3$)

SUMMARY OF THE DISCLOSURE

In summary of this disclosure, the present invention provides a high purity alkali metal chlorite having a low carbonate content and methods of producing the same by producing chlorine dioxide by a manufacturing process carried out at subatmospheric pressures and reacting the chlorine dioxide so produced with reducing agent, such as hydrogen peroxide, in the presence of an alkali. The chlorine dioxide generating process may be hydrogen peroxide-based, which preferably is cascaded to a methanol-based chlorine dioxide generating process. The chlorine dioxide may preferably be fed directly from the chlorine dioxide generator to the chlorite formation reactor without the intermediate step of recovery of an aqueous solution of chlorine dioxide. Modifications are possible within the scope of the invention.

What we claim is:

1. A method of producing sodium chlorite with a low carbonate level, which comprises:

effecting the generation of chloride dioxide by reducing chlorate ions to chlorine dioxide in an aqueous acid reaction medium at its boiling point under a subatmospheric pressure in a first reaction zone, removing a gaseous admixture containing chlorine dioxide from said first reaction zone, feeding said chlorine dioxide to a second reaction zone, reacting the chlorine dioxide with an aqueous sodium hydroxide solution and hydrogen peroxide as a reducing agent in an aqueous reaction medium in said second reaction zone, said second reaction zone being maintained under a subatmospheric pressure of about 50 to about 200 mmHg, and removing an aqueous solution of alkali metal chlorite having a low carbonate ion concentration from said second reaction zone.

2. The method of claim 1 wherein the carbonate content of said sodium chlorite solution based on an about 37 wt % sodium chlorite solution is about 1 wt % and based on solid about 80 wt % sodium chlorite is below about 2 wt %.

3. The method of claim 1 wherein said aqueous sodium chlorite solution contains less than 0.5 wt. % sodium carbonate as $Na_2CO_3$ based on an about 37 wt. % sodium chlorite solution and less than 1 wt. % sodium carbonate as $Na_2CO_3$ based on solid about 80 wt. % sodium chlorite.

4. The method of claim 3 wherein said aqueous sodium chlorite solution contains less than 0.3 wt % sodium carbonate as $Na_2CO_3$ based on an about 37 wt % sodium chlorite solution and less than 0.6 wt % sodium carbonate as $Na_2CO_3$ based on solid about 80 wt % sodium chlorite.

5. The method of claim 1 including crystallizing the sodium chlorite from the aqueous solution thereof.

6. The method of claim 1 wherein said aqueous acid reaction medium producing chlorine dioxide contains about 1 to about 5 M chloride ions and about 0.1 to about 7 M chlorate ions and has a total acid normality of about 0.05 to about 5 N.

7. The method of claim 6 wherein said chloride ion concentration is about 2 to about 3 M, said chlorate ion concentration is about 5 to about 7 M and said total acid normality is about 0.1 to about 2 N.

8. The method of claim 6 wherein said chlorine dioxide in said gaseous admixture is fed to the second reaction zone by initially condensing the gaseous admixture to an aqueous chlorine dioxide solution, removing chlorine codissolved in the aqueous chlorine dioxide solution, stripping chlorine dioxide with an inert gas or gas mixture from the aqueous chlorine dioxide solution to form a second gaseous admixture, and forwarding the second gaseous admixture to the second reaction zone.

9. The method of claim 1 wherein said chlorine dioxide is produced by reducing said chlorate ions with hydrogen peroxide at a total acid normally of about 2 N to about 14 N and a chlorate ion concentration of about 0.1 M to saturation.

10. The process of claim 9 wherein said total acid normality is about to about 12 N and the chlorate ion concentration is about 0.5 M to about 3.5 M.

11. The process of claim 9 wherein said chlorine dioxide in said gaseous admixture is fed to the second reaction zone by conveying the gaseous admixture directly to the second reaction zone.

12. The method of claim 1 wherein said chlorine dioxide in said gaseous admixture is formed by reducing chlorate ions with hydrogen peroxide in the presence of sulfuric acid, by-product acidic sulfate, as an aqueous solution or slurry, effluent from the first reaction zone is forwarded to a further reaction zone, to provide at least part of the acid feed to a chlorine dioxide-producing aqueous acid reaction medium in which chlorate ions are reduced by methanol to form chlorine dioxide, and chlorine dioxide generated in said further reaction zone is utilized for pulp bleaching.

13. The method of claim 1 wherein said aqueous reaction medium in said second reaction zone has a pH of about 11.8 to about 13.0, while an excess of hydrogen peroxide is maintained in said aqueous reaction medium.

14. The method of claim 1 wherein said excess hydrogen peroxide in said aqueous reaction medium is maintained at an ORP value in the range of about −30 to about −200 mV vs Ag/AgCl.

15. The method of claim 14 wherein said subatmospheric pressure is about 80 to about 150 mm Hg, the pH of the aqueous reaction medium is about 12.0 to about 12.6 and said ORP value is about −40 to about −90 mV vs Ag/AgCl.

16. The method of claim 13 wherein said second reaction zone takes the form of a packed tower.

17. The method of claim 16 wherein, in said packed tower, chlorine dioxide flows counter-currently to the aqueous sodium hydroxide solution having the hydrogen peroxide dissolved therein.

* * * * *